United States Patent
Filatov et al.

(10) Patent No.: US 12,327,431 B1
(45) Date of Patent: Jun. 10, 2025

(54) METHODS AND SYSTEMS FOR FORGERY DETECTION

(71) Applicant: Parascript LLC, Longmont, CO (US)

(72) Inventors: Alexander Filatov, Longmont, CO (US); Ivan Bulatov, Longmont, CO (US); Dmitry Gershuny, Longmont, CO (US)

(73) Assignee: Parascript LLC, Longmont, CO (US)

( * ) Notice: Subject to any disclaimer, the term of this patent is extended or adjusted under 35 U.S.C. 154(b) by 0 days.

(21) Appl. No.: 18/416,323

(22) Filed: Jan. 18, 2024

(51) Int. Cl.
| | |
|---|---|
| G06K 9/00 | (2022.01) |
| G06V 10/82 | (2022.01) |
| G06V 30/148 | (2022.01) |
| G06V 30/22 | (2022.01) |
| G06V 30/42 | (2022.01) |
| G06V 40/30 | (2022.01) |

(52) U.S. Cl.
CPC ............. *G06V 40/33* (2022.01); *G06V 10/82* (2022.01); *G06V 30/153* (2022.01); *G06V 30/22* (2022.01); *G06V 30/42* (2022.01)

(58) Field of Classification Search
CPC ...... G06V 40/33; G06V 30/153; G06V 10/82; G06V 30/42; G06V 30/22
See application file for complete search history.

(56) References Cited

U.S. PATENT DOCUMENTS

| | | | | |
|---|---|---|---|---|
| 4,433,436 | A * | 2/1984 | Carnes ................... | G07C 9/243 235/487 |
| 7,020,320 | B2 | 3/2006 | Filatov | |
| 2004/0228514 | A1* | 11/2004 | Houle .................... | G06V 40/30 382/137 |
| 2005/0163377 | A1* | 7/2005 | Walch .................... | G06V 30/18 382/187 |
| 2019/0114743 | A1* | 4/2019 | Lund .................. | G06V 30/1444 |
| 2020/0053243 | A1* | 2/2020 | Morita ............... | H04N 1/00875 |
| 2021/0064859 | A1* | 3/2021 | Muramatsu .......... | G06V 30/414 |
| 2021/0073514 | A1* | 3/2021 | Sangala ................. | G06F 18/22 |

(Continued)

OTHER PUBLICATIONS

Chicco, Davide, "Siamese neural networks: an overview", Artificial Neural Networks, Methods in Molecular Biology, 2020, vol. 2190, (3rd ed.), New York City, NY, USA: Springer Protocols, Humana Press, pp. 73-94.

(Continued)

*Primary Examiner* — Michael J Vanchy, Jr.
(74) *Attorney, Agent, or Firm* — Merchant & Gould P.C.

(57) ABSTRACT

A method and system of writable document forgery detection including receiving a writable document, the writable document comprising one or more fields, each field being configured to receive a handwritten segment, extracting a first handwritten segment from at least one field, wherein the first handwritten segment comprises a plurality of first pixels, extracting a second handwritten segment, the second handwritten segment comprising a plurality of second pixels, assigning to each first pixel and to each second pixel a likelihood of belonging to a handwritten segment, comparing the first handwritten segment to the second handwritten segment based on the assigned likelihood of each first pixel and each second pixel, and determining whether the first handwritten segment and the second handwritten segment are from a same writer based on the comparison.

24 Claims, 8 Drawing Sheets

(56) References Cited

U.S. PATENT DOCUMENTS

2021/0258447 A1* 8/2021 Nishida ................ G06V 30/413
2022/0075987 A1   3/2022 Houmani et al.
2022/0156756 A1   5/2022 Eapen et al.

OTHER PUBLICATIONS

Shaikh, A.S. et al., "Attention based Writer Independent Verification", arXiv:2009.04532v3 [cs.CV], Oct. 1, 2020, 7 pages.
Bulacu, Marius et al., "Text-Independent Writer Identification and Verification Using Textural and Allographic Features", IEEE Transactions on Pattern Analysis and Machine Intelligence, vol. 29, No. 4, Apr. 2007, 17 pages.
Ronneberger, Olaf et al., "U-Net: Convolutional Networks for Biomedical Image Segmentation", 2015, Springer Publishing, Switzerland, MICCAI 2015, Part III, LNCS 9351, pp. 234-241.
Dzuba, Gregory et al., "Check Amount Recognition Based on the Cross Validation of Courtesy and Legal Amount Fields," Automatic Bankcheck Processing (1997), pp. 177-193.
International Search Report issued Apr. 14, 2025, in International Application No. PCT/US2025/0117970.

\* cited by examiner

METHODS AND SYSTEMS FOR FORGERY DETECTION

BACKGROUND

Handwriting verification is a technique used by various commercial entities to detect forgeries in writeable documents such as, e.g., checks, contracts, and the like. Handwriting verification may be used to compare handwriting on various documents or on various portions of the same document.

SUMMARY

In one aspect, the technology relates to a method for writable document forgery detection, the method including receiving a writable document, the writable document including one or more fields configured to receive a handwritten segment, extracting a first handwritten segment from at least one field, the first handwritten segment including a plurality of first pixels, extracting a second handwritten segment, the second handwritten segment including a plurality of second pixels, assigning to each first pixel and to each second pixel a likelihood of belonging to a handwritten segment, comparing the first handwritten segment to the second handwritten segment based on the assigned likelihood of each first pixel and each second pixel, and assessing a likelihood of the first handwritten segment and the second handwritten segment being from a same writer based on the comparison.

In various examples, at least one of the plurality of first pixels and of the plurality of second pixels includes a data structure, the data structure including a plurality of dimensions. In other examples, the method further includes determining whether the first handwritten segment and the second handwritten segment are from a same writer based on the assessed likelihood. In additional examples, the second handwritten segment is one of another field of the writable document, and another document. For example, assigning to each first pixel and to each second pixel the likelihood of belonging to a handwritten segment includes inputting an image of the first handwritten segment and an image of the second handwritten segment into a first trainable model, and outputting the likelihood of belonging to a handwritten segment for each first pixel and for each second pixel from the first trainable model. For example, the first trainable model includes a first neural network.

In other examples, wherein comparing the first handwritten segment to the second handwritten segment includes inputting the likelihood of belonging to a handwritten segment of the first pixels and the likelihood of belonging to a handwritten segment of the second pixels into a second trainable model, and outputting a similarity factor between the first pixels and the second pixels from the second trainable model. For example, the second trainable model includes a second neural network. In additional examples, the method further includes establishing a similarity threshold, and determining that the first handwritten segment and the second handwritten segment are from the same writer when the similarity factor is equal to or greater than the similarity threshold. For example, the one or more fields include at least one handwritten field on a check.

In an additional example, extracting the first handwritten segment includes extracting a plurality of first segments, extracting the second handwritten segment includes extracting a plurality of second segments, comparing the first handwritten segment to the second handwritten segment includes comparing a combination of the extracted plurality of first segments to the extracted plurality of second segments, and assessing the likelihood includes assessing a plurality of likelihoods for each combination of first segment and second segment being from a same writer, and averaging the assessed plurality of likelihoods.

In another aspect, the technology relates to a writable document forgery detection system that includes a data receiver, an updatable data repository functionally coupled to the data receiver, a computing device operatively coupled to the data receiver and to the updatable data repository and including a memory, the memory storing instructions. The instructions, when executed by the processor, perform a set of operations. In various examples, the operations include receiving, at the data receiver, a writable document including one or more fields, each field being configured to receive a handwritten segment, extracting, via the computing device, a first handwritten segment from at least one field, wherein the first handwritten segment includes a plurality of first pixels, extracting, via the computing device, a second handwritten segment, the second handwritten segment including a plurality of second pixels, assigning, via the computing device, to each first pixel and to each second pixel a likelihood of belonging to a handwritten segment, comparing, via the computing device, the first handwritten segment to the second handwritten segment based on the assigned likelihood of each first pixel and each second pixel, and assigning, via the computing device, a likelihood of the first handwritten segment and the second handwritten segment being from a same writer based on the comparison.

In other examples, at least one of the plurality of first pixels and of the plurality of second pixels includes a data structure, the data structure including a plurality of dimensions. In further examples, the instructions further include determining whether the first handwritten segment and the second handwritten segment are from a same writer based on the comparison. In additional examples, the second handwritten segment is one of another field of the writable document, and another document. In a further example, the set of instructions includes assigning to each first pixel and to each second pixel the likelihood of belonging to a handwritten segment by inputting an image of the first handwritten segment and an image of the second handwritten segment into a first trainable model, and outputting the likelihood of belonging to a handwritten segment for each first pixel and for each second pixel from the first trainable model. For example, the first trainable model includes a first neural network.

In further examples, the set of instructions includes comparing the first handwritten segment to the second handwritten segment by inputting the likelihoods of the first pixels and the likelihoods of the second pixels into a second trainable model, and outputting a similarity factor between the first pixels and the second pixels from the second trainable model. For example, the second trainable model includes a second neural network. In another example, the set of instructions further includes establishing a similarity threshold, and determining that the first handwritten segment and the second handwritten segment are from the same writer when the similarity factor is equal to or greater than the similarity threshold. For example, the one or more fields includes at least one handwritten field on a check.

In another example, the instructions include extracting the first handwritten segment by extracting a plurality of first segments, extracting the second handwritten segment by extracting a plurality of second segments, comparing the first handwritten segment to the second handwritten segment by comparing a combination of the extracted plurality of first segments to the extracted plurality of second segments, and assessing the likelihood by assessing a plurality of likelihoods for each combination of first segment and second segment being from a same writer, and averaging the assessed plurality of likelihoods.

DETAILED DESCRIPTION

Check washing is a type of fraud that occurs when a stolen check is treated with various chemicals to remove the ink thereon, or "wash" the check. After the check is washed, it is rewritten to a new payee, with, e.g., a higher amount, and deposited into the bank account of the new payee. Typically, the field on the check that is washed and re-written may be the Payee field, or the Legal Amount field. Although the Signature field may also be washed, it may be preserved, for example by placing a piece of tape over the Signature field during the check washing process, in order to convince the bank to pay out the forged Legal Amount to the forged Payee. A fraudster, by preserving the Signature field, hopes to avoid detection of fraud if the bank of the account holder has a process of comparing a signature on a presented check with a reference signature of the account holder.

In order to be washed, checks are typically stolen from the mail. Check washing fraud is a rapidly growing challenge, and this growth is attributed to the growing availability of convenience-centered technology such as, e.g., remote deposit options. Checks can be deposited remotely and anonymously at Automated Teller Machines (ATMs) or via mobile deposit on phone applications. Current check processing workflows typically operate with binarized check images. Color or greyscale information is typically not available for such images and cannot be relied on for handwriting extraction. Methods to extract handwritten fields on a check image were developed previously, e.g., G. Dzuba, A. Filatov, D. Gershuny, I. Kil, V. Nikitin "Check Amount Recognition Based On The Cross Validation Of Courtesy And Legal Amount Fields", 1997; and U.S. Pat. No. 7,020,320. Methods for writer verification based on handwriting style analysis were developed previously, e.g., M. A. Shaikh, T. Duan, M. Chauhan, S. N. Srihari "Attention based Writer Independent Verification", 2020; and M. Bulacu, L. Schomaker "Text-Independent Writer Identification and Verification Using Textural and Allographic Features", 2007.

However, the accuracy of handwriting extraction may be negatively affected by such factors as background texture of a check, which is partially visible on binarized images, overlapping of handwriting with preprinted text, preprinted lines, boxes, and the like. Such limited accuracy may be acceptable for industrial applications of check amount recognition when the restricted lexicon of words used in courtesy and legal amount fields is limited. However, such accuracy limitation may negatively affect the accuracy of a writer verification task. Examples of this disclosure include a method of document forging, e.g., check washing, detection based on a comparison between the handwriting style in a first field of a check and the handwriting style in a second field of the same check, or based on a comparison of the handwriting style of a presented check with the handwriting style of an account holder. Other applications of these examples may be or include, e.g., contracts that include a plurality of fields to be handwritten by a signing party of the contract, and the like.

In various examples, a method of automated check washing detection allows to detect check washing fraud when only a check presented to a financial institution is available for inspection. Detecting fraud at this stage is advantageous because it allows to catch a fraud or forgery attempt before any funds are made available to the fraudster, for example, during the process of remote deposit in an ATM. The example method automatically compares various segments of handwriting in various fields of the same check in order to attempt to detect whether more than one writer filled in the check, e.g., whether one of the fields is written by a different person than another one of the fields. For example, the handwriting in Signature field may be compared to the handwriting in the Payee field or with any combination of handwritten segments of the same check other than the Signature field.

Another example method of automated check washing detection may be implemented when reference documents of the account holder, e.g., checks previously written on the account, are available for comparison. Advantages of this method include the fact that fraud or forgery detection does not depend on whether the Signature field was preserved by the fraudster during check washing, and may provide a higher accuracy of detection because more reference handwritten segments may be used in the process of comparison. In other examples, both of the methods discussed above may be used at different processing stages of the same check. Implementing either or both of the methods discussed above includes extracting handwriting from an image of a document, and performing writer verification based on a handwriting style analysis. Accordingly, check washing detection may be integrated within an automated check processing workflow every time a commercial institution, e.g., a bank, receives a handwritten check.

Examples of the disclosure include a unified method of handwriting extraction and writer verification that includes extracting image pixels from handwritten segments, and that does not require making a binary decision on whether any given pixel is, or is not, part of a handwritten segments. The method assigns a value to each pixel characterizing the likelihood of that pixel to be a part of a handwritten segment, and may be applied either to an entire check or writable document, or to a selected area of the check or writable document. Selected areas may include, for example, a specific field or a plurality of fields of the check or writable document. The word "pixel" as used herein is a reference to the smallest addressable element of an image. Each individual pixel may have certain values associated therewith. The values may indicate color, likelihood of being a part of handwriting, and the like. The values may be or include a data structure such as, e.g. tensor, graph, and the like.

Examples of the disclosure may also include an end-to-end processing chain of neural networks, e.g., of two deep learning neural networks. The example method may start with automatically producing a set of images to be compared in order to assess whether the handwriting in the images belongs to the same writer, for example, an image of a check-under-verification and an image of a reference check, or an image containing a signature on a check-under-verification and an image containing the payee name on the same check. For example, the first neural network receives the images as the input, extract pixels for each image, and returns values for each pixel characterizing the likelihood of that pixel being a part of a handwritten segment. These values may also include information about neighboring pixels. The output of the first neural network may then be transferred as an input to the second neural network configured to perform handwriting style comparison. The second neural network outputs a value characterizing the likelihood that the handwriting on a plurality of images belongs to a same writer.

Figure 1:
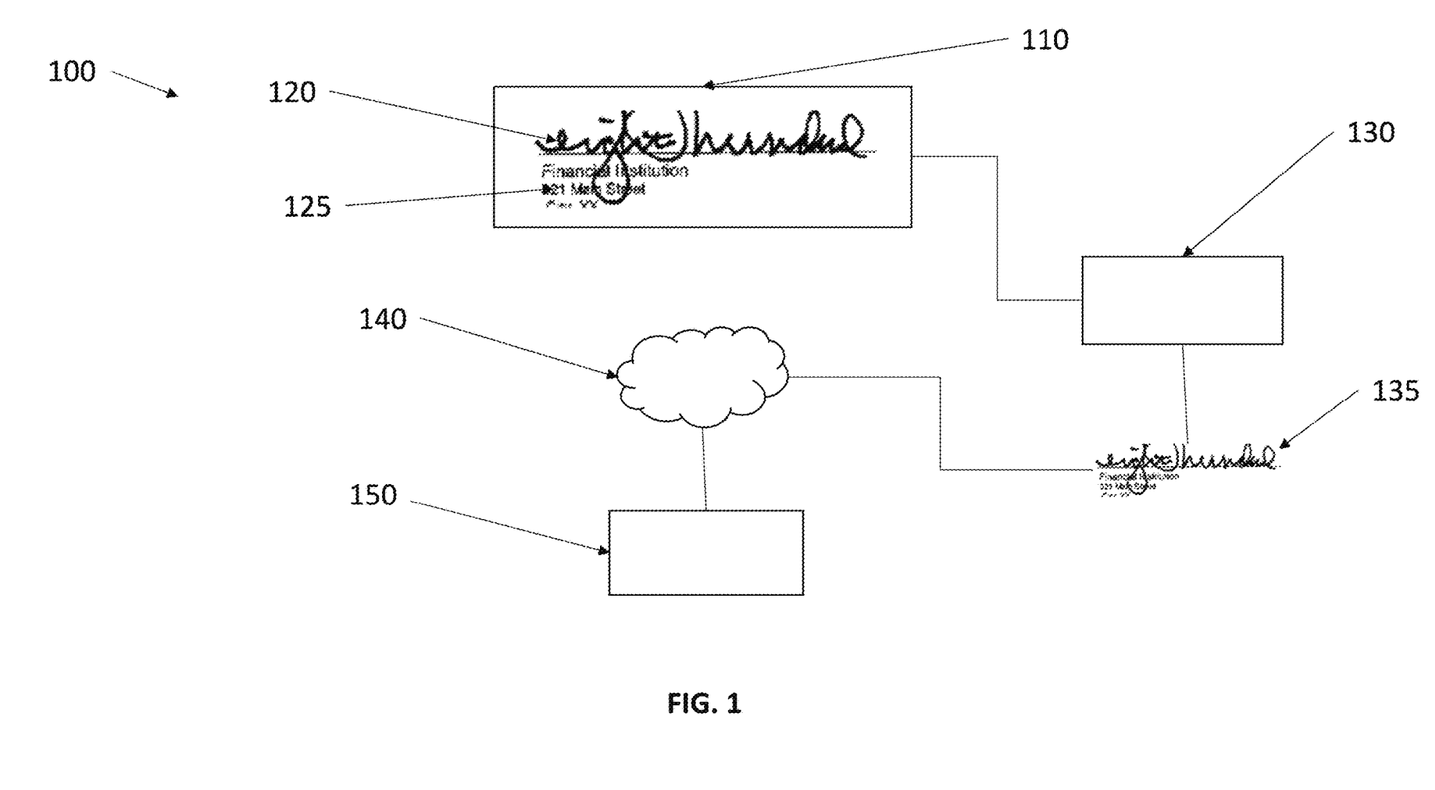
FIG. 1 is a diagram illustrating a system of handwriting verification, in accordance with various examples of the disclosure.

FIG. 1 is a diagram illustrating a method and system of handwriting verification, in accordance with various aspects. In FIG. 1, the system 100 includes a writable document 110 such as, e.g., a check, a contract, a letter, or other writable document. The writable document 110 may include a handwritten segment 120 and a pre-printed segment 125. The pre-printed segment 125, when the writable document 110 is a check, may be, e.g., the background of the check 110 or any of the pre-printed fields such as the check number, the "pay to" field, the "dollars" field, and the like. In the illustration of FIG. 1, the pre-printed segment 125 indicates a financial institution. The handwritten segment 120 may be written by a person (not shown) directly on the writable document 110. In various aspects, the handwritten segment 120 may have been written via, e.g., a pen, a stylus, other writing member, a finger of the person, or other method of entering a handwritten segment.

Figure 2:
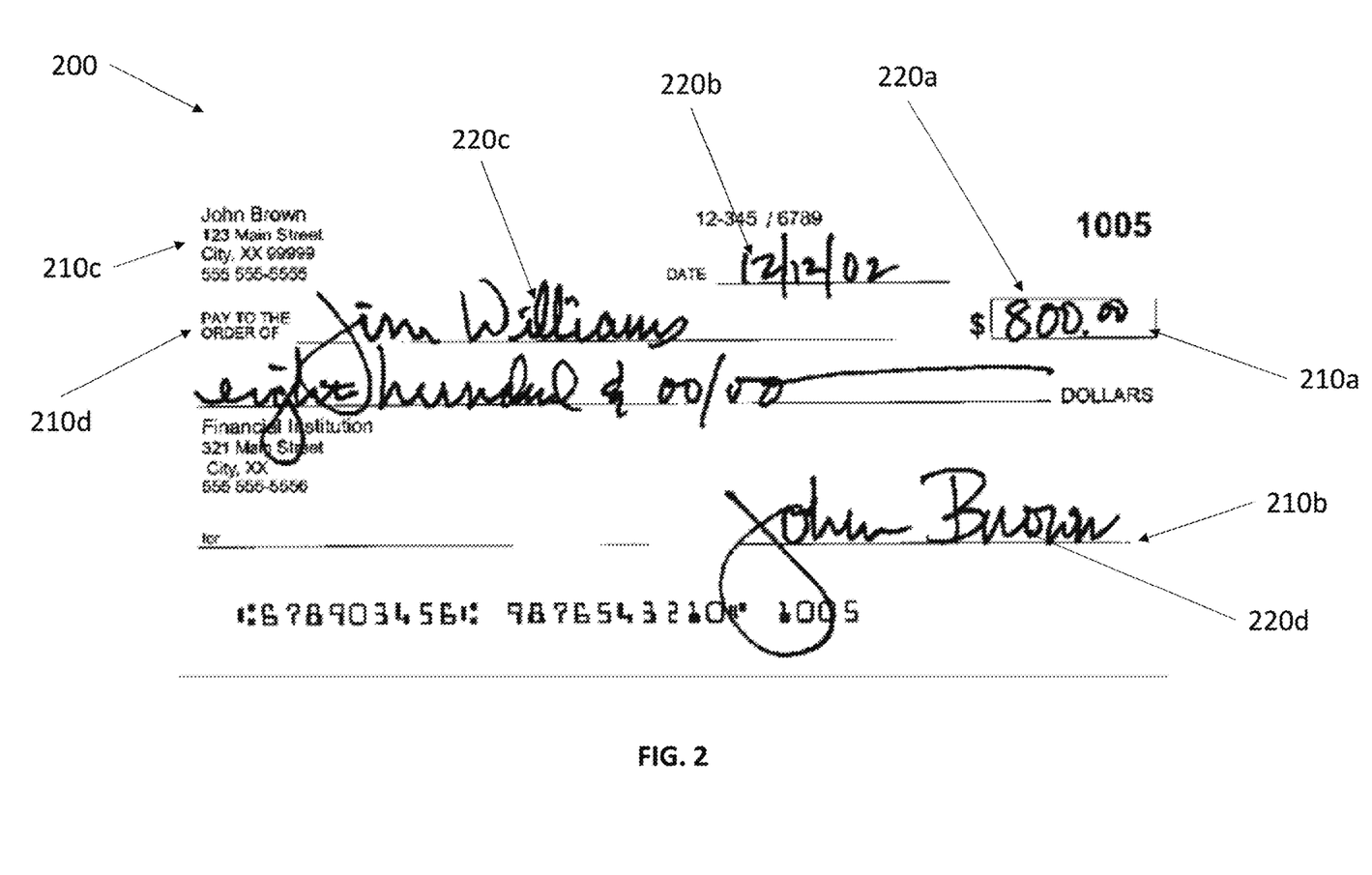
FIG. 2 is an illustration of a writable document, in accordance with various examples of the disclosure.
Figure 3:
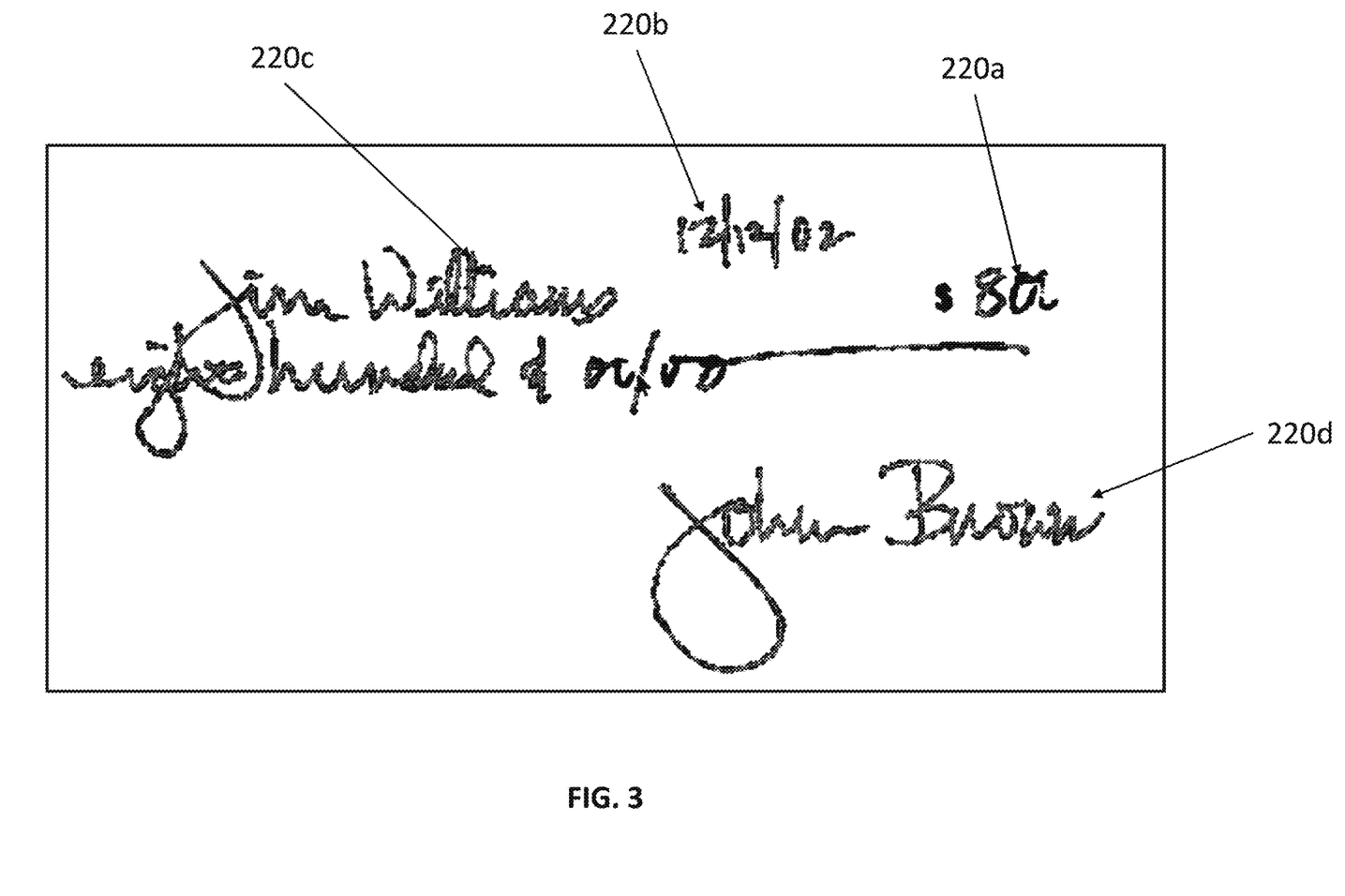
FIG. 3 is an illustration of an extracted handwritten segment, in accordance with various examples of the disclosure.
Figure 4A:
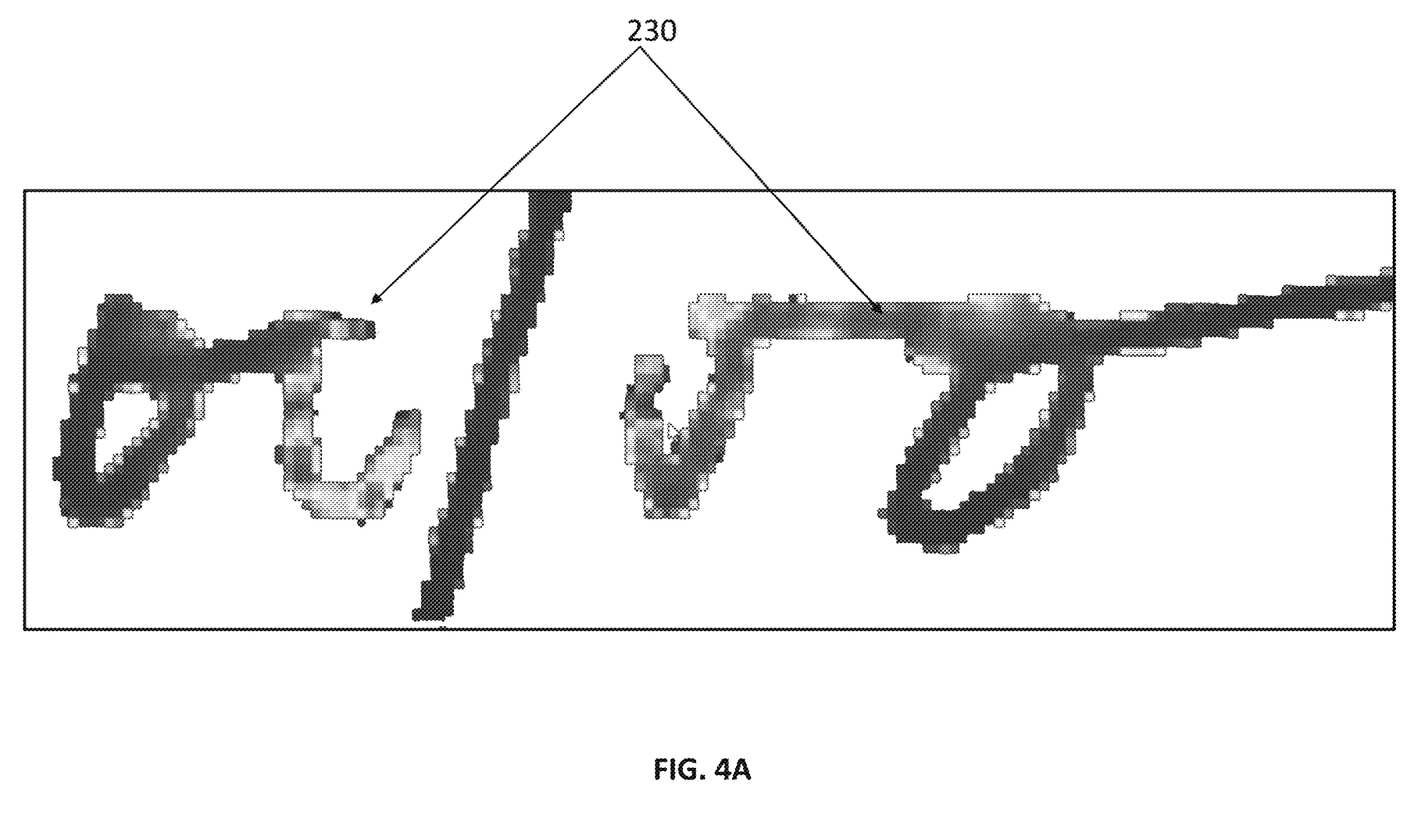
FIGS. 4A and 4B are illustrations of handwritten segment pixels, in accordance with various examples of the disclosure.
Figure 4B:
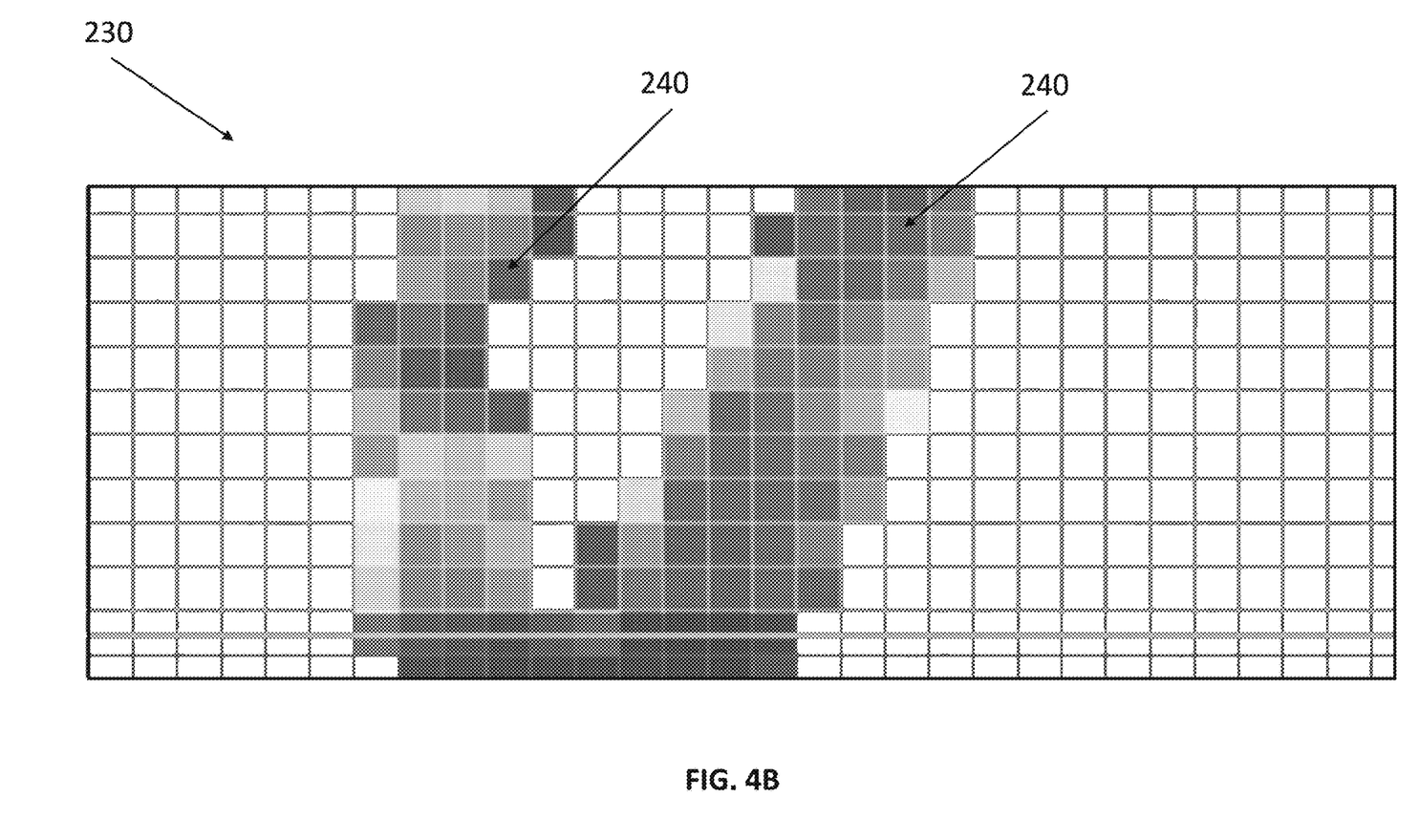
Figure 5:
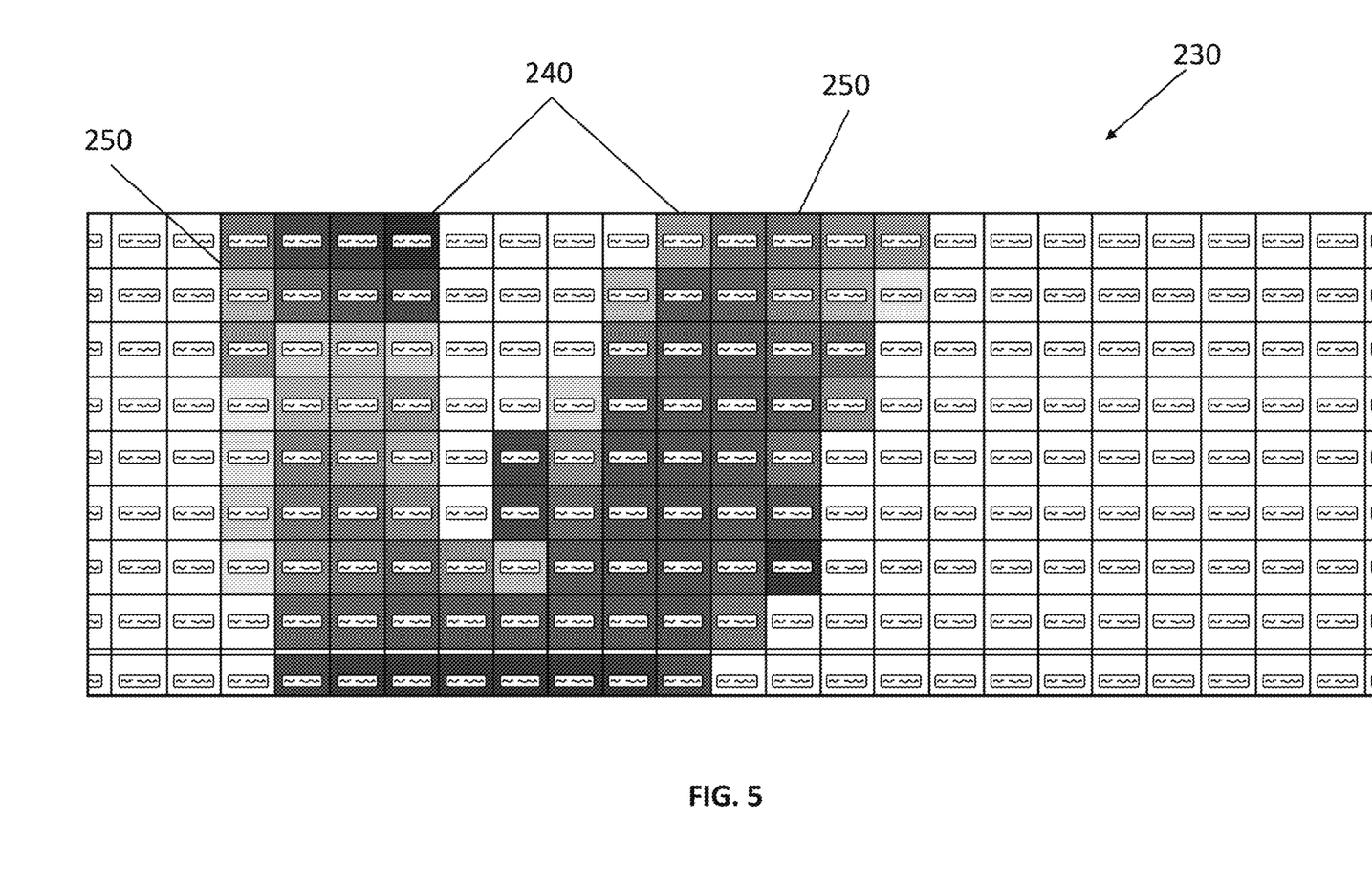
FIG. 5 is an illustration of handwritten segment likelihoods, in accordance with various examples of the disclosure.

In various examples, a capture device 130 such as, e.g., a scanner 130, may be configured to capture or scan at least a portion of the writable document 110. The capture device 130 may be, e.g., located at a publicly accessible ATM, located in a financial institution, installed on a person's handheld device, and the like. The capture device 130 may be coupled to a computing device 150 via a connection such as, e.g., a network 140, and may transfer the captured portion of the writable document 110, illustrated as captured image 135, from the capture device 130 to the computing device 150 via the network 140. For example, the network 140 may be the internet, a local area network, a wide area network, a land line, a cloud, a wireless network, or the like. In various aspects, the computing device 150 may be, e.g., similar to the processing element 704 described in FIG. 7 below. For example, the computing device 150 may include one or more executable software applications using, e.g., one or more neural networks or trainable models. In operation, the computing device 150, via one of the neural networks, extracts the handwritten segment 120 from the captured image 135 of the writable document 110, and separately reproduces the handwritten segment 120. As further described below, FIG. 2 illustrates a writable document 110 that include pre-printed portions 210a-210d and handwritten segments 220a-220d, e.g., as captured by the capture device 130. As also further described below, FIG. 3 illustrates the extracted handwritten segments 220a-220c. Referring back to FIG. 1, the neural network may reproduce the handwritten segment 120 in the form of a plurality of pixels, as illustrated in FIGS. 4A and 4B. The variations in colors or degree of shading in the handwritten segment 120 illustrated in FIGS. 4A and 4B represent varying likelihoods that the pixel is part of the handwritten segment 120 instead of being part of the pre-printed segment 125. For example, FIG. 5 illustrates such likelihoods on each pixel.

FIG. 2 is an illustration of a writable document, in accordance with various examples of the disclosure. In FIG. 2, the writable document 200 includes pre-printed portions 210a-210d and handwritten segments 220a-220d. In the case of, e.g., a check as the writable document 200, then the pre-printed portion 210c may include a field such as "Date," the pre-printed portion 210d may include a field such as "Pay to the Order of," the pre-printed portion 210a may include a field for the amount of money to be paid, and/or the pre-printed portion 210d may include a field to receive the signature of the payor. The handwritten segments 220a-220d are portions that are actually written by a person and may be different for each person and/or each context. In the case of, e.g., a check as the writable document 200, then the handwritten segment 220a may include the actual amount of money being paid out, the handwritten segment 220c may include the name of the payee, the handwritten segment 220b may include the date, the handwritten segment 220d may include the signature of the payor, and the like.

FIG. 3 is an illustration of an extracted handwritten segment, in accordance with various examples of the disclosure. FIG. 3 corresponds to FIG. 2 without the pre-printed portions 210a-210d. Accordingly, FIG. 3 includes the handwritten segments 220a-220d, with a residual pre-printed portion in the form of the "$" sign. In operation, in the check 200 illustrated in FIG. 2, one or more fields of the handwritten segments 220a-220d may be extracted from the check 200. For example, extracting the handwritten segments 220a-220d from the check 200 may be accomplished by first inputting at least a portion of the check 200 as an input to trainable model such as, e.g., a neural network. The neural network, also referred to herein as a first neural network, may be or include, e.g., a U-net neural network, as explained in, e.g., Ronneberger O, Fischer P, Brox T (2015). "U-Net: Convolutional Networks for Biomedical Image Segmentation". Once the check 200 has been inputted into the first trainable model or neural network, the generated output from the first neural network may itself be inputted into a second trainable model or neural network. For example, the second neural network may be or include a Siamese neural network, as explained in, e.g., Chicco, Davide (2020; "Siamese neural networks: an overview," *Artificial Neural Networks*, Methods in Molecular Biology, vol. 2190 (3rd ed.), New York City, New York, USA: Springer Protocols, Humana Press, pp. 73-94). The handwritten segments 220a-220d, which are the result of the check 200 being input into the first trainable model or neural network discussed above, may be displayed in the form of a plurality of pixels, as illustrated in FIGS. 4A and 4B and further discussed below.

FIGS. 4A and 4B are illustrations of handwritten segment pixels, in accordance with various examples of the disclosure. FIG. 4A illustrates an enlarged displayed portion 230, the displayed portion 230 being a part of a handwritten segment 220a-220d. In FIG. 4A, various parts of the displayed portion 230 are illustrated in various shading levels or colors, each shading level or color being representative of a likelihood that the corresponding portion of the displayed portion 230 belongs to a handwritten segment 220a-220d or to a pre-printed portion 210a-210d. FIG. 4B is an enlarged view of the displayed portion 230 of FIG. 4A. In FIG. 4B, the displayed portion 230 is composed of a plurality of pixels 240, each pixel 240 having a given degree of shading or color that is representative of a likelihood that the pixel 240 belongs to a handwritten segment 220a-220d or to a pre-printed portion 210a-210d.

FIG. 5 is an illustration of handwritten segment likelihoods, in accordance with various examples of the disclosure. FIG. 5 is an enlarged view of the displayed portion of FIG. 4B showing individual pixels 240. In FIG. 5, each of the plurality of pixels 240 is assigned a numerical value 250 representing the likelihood of the pixel 240 being part of any one of the handwritten segments 220a-220d and not part of any one of the pre-printed portion 210a-210d of the check 200. In the illustration of FIG. 5, the degree of shading or color of each pixel 240 may be correlated to that likelihood. For example, pixels 250 having lighter colors indicate a higher likelihood that the pixels 250 are handwritten pixels, and pixels 250 having darker colors indicate a lower likelihood that the pixels 250 are handwritten pixels.

Figure 6:
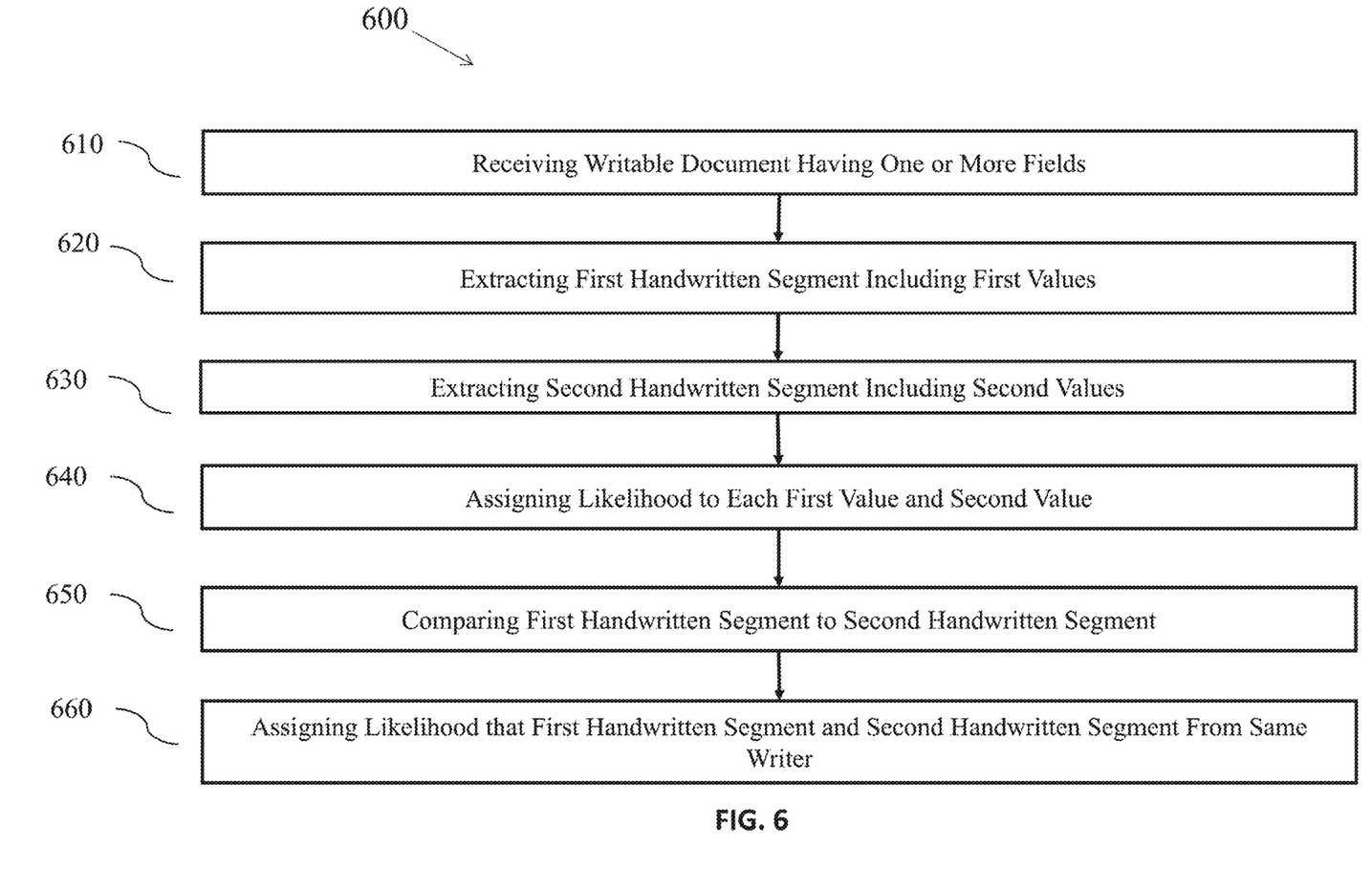
FIG. 6 is a flowchart describing a method of forgery detection, in accordance with various examples of the disclosure.

FIG. 6 is a flowchart describing a method of forgery detection, in accordance with various examples of the disclosure. For the sole purpose of convenience, method 600 is described through use of at least the example system 100 described above. However, it is appreciated that the method 600 may be performed by any suitable system.

Operation 610 includes receiving a writable document, and the writable document may include one or more fields, each field being configured to receive a handwritten segment. For example, the writable document may be a financial instrument with a number of fields for, e.g., signatures or additional information. In other examples, the writable document may be a check and the fields include, e.g., a signature field, a payee ("pay to") field, and an amount field. The one or more fields may include at least one handwritten segment.

Operation 620 includes extracting a first handwritten segment from at least one field, wherein the first handwritten segment includes a plurality of first pixels. With reference to FIGS. 2 and 3 above, operation 620 includes extracting any one handwritten segment 220a-220d from the writable document, e.g., check, 200. With reference to FIGS. 4A and 4B, the handwritten segments 220a-220d have a plurality of pixels 230, referred to above as enlarged displayed portions 230. The handwritten segments 220a-220d may also be referred to herein as fields 220a-220d.

Operation 630 includes extracting a second handwritten segment, the second handwritten segment including a plurality of second pixels. In an example of the disclosure, the second handwritten segment may be one of the fields or handwritten segments of the same writing instrument as for the first handwritten segment. For example, with reference to FIGS. 2 and 3 above, the second handwritten segment may be another one of the handwritten segments or fields 220a-220d. With reference to FIG. 2, if the handwritten segment of the check 200 extracted during operation 620 is the "pay to" field 220c, then the second handwritten segment extracted during operation 630 may be the "amount" field 220a. In another example of the disclosure, the second handwritten segment may be a handwritten segment extracted from a different document altogether, e.g., another document, provided the other document is authenticated to have been written by the same person as the owner of the current document 200. For example, with reference to FIG. 2, the second handwritten segment may be a signature that a bank may have on file from the person who owns the bank account corresponding to the check 200. In various examples, the plurality of first pixels and/or of the plurality of second pixels may be or include a data structure, e.g. tensor, graph, etc.

Operation 640 includes assigning to each first pixel and to each second pixel a likelihood of being a handwritten pixel. For example, operation 640 may include inputting an image of the first handwritten segment and an image of the second handwritten segment into a first trainable model such as, e.g., a first neural network, and outputting the likelihood of being a handwritten pixel for each first pixel and for each second pixel from the first trainable model or neural network. The first neural network may be or include, e.g., a U-net neural network. With reference to FIGS. 2 and 3, the image of the handwritten segments 220a-220d may be inputted into the first trainable model or neural network. With reference to FIG. 5, each pixel 240 may be assigned a likelihood. Accordingly, each of the various pixels 240 that make up the entirety of the handwritten segments 220a-220d may be individually assigned a likelihood, and the assigned likelihood is indicative of how likely the given pixel is part of a handwritten segment or is part of a pre-printed portion 210a-210d of the writable document or check 200. For example, with reference to FIGS. 2 and 5, if the pixel 240 is part of the term "DOLLARS," then the assigned likelihood thereof of being part of handwritten segment written by the signer of the check 200 is likely to be substantially low. Likewise, if the pixel 240 is part of the date "12/12/02," then the assigned likelihood thereof of being part of handwritten segment written by a person is likely to be higher. In another example, if the first handwritten segment is the field 210a-210d that corresponds to the amount paid out (e.g., $800.00 in FIG. 2) and the second handwritten segment is the field 210a-210d that corresponds to the signature (e.g., "John Brown" in FIG. 2), then the assigned likelihood of both the first pixels and the second pixels is likely to be high, indicating that both the first and the second pixels belong to handwritten segments which have been handwritten by a person.

Operation 650 includes comparing at least one first handwritten segment to at least one second handwritten segment based on the assigned likelihood of each first pixel and each second pixel. For example, operation 650 may include establishing a likelihood threshold for the first pixels and the second pixels. For each first pixel and second pixel having a likelihood of belonging to a handwritten segment that is equal to or greater than the likelihood threshold, operation 650 includes inputting the image of the first handwritten segment and the image of the second handwritten segment into a second trainable model or neural network, and outputting a similarity factor between the first handwritten segment and the second handwritten segment from the second trainable model or neural network. In operation 650, a notion of similarity refers to similarity of styles of handwriting. Any combination of first handwritten segments may be compared to any combination of second handwritten segments. The second neural network may be or include a Siamese neural network. Although the first and second neural networks are discussed herein, other trainable models may be used instead.

Operation 660 includes assessing the likelihood that the first handwritten segment and the second handwritten segment are from a same writer based on the comparison. Operation 660 may further include determining whether the first handwritten segment, or any combination of first handwritten segments, and the second handwritten segment, or any combination of second handwritten segments, are from a same writer based on the assessed likelihood. For example, operation 660 may include establishing a similarity threshold and then determining that the first handwritten segment and the second handwritten segment are from the same writer when the similarity factor is equal to or greater than the similarity threshold. In another example, several individual likelihoods may be obtained as a result of assessing similarity between any combination of first handwritten segments and any combination of second handwritten segments. Further, a combined likelihood may be obtained, for example, by averaging individual likelihoods or by applying a trainable model.

Figure 7:
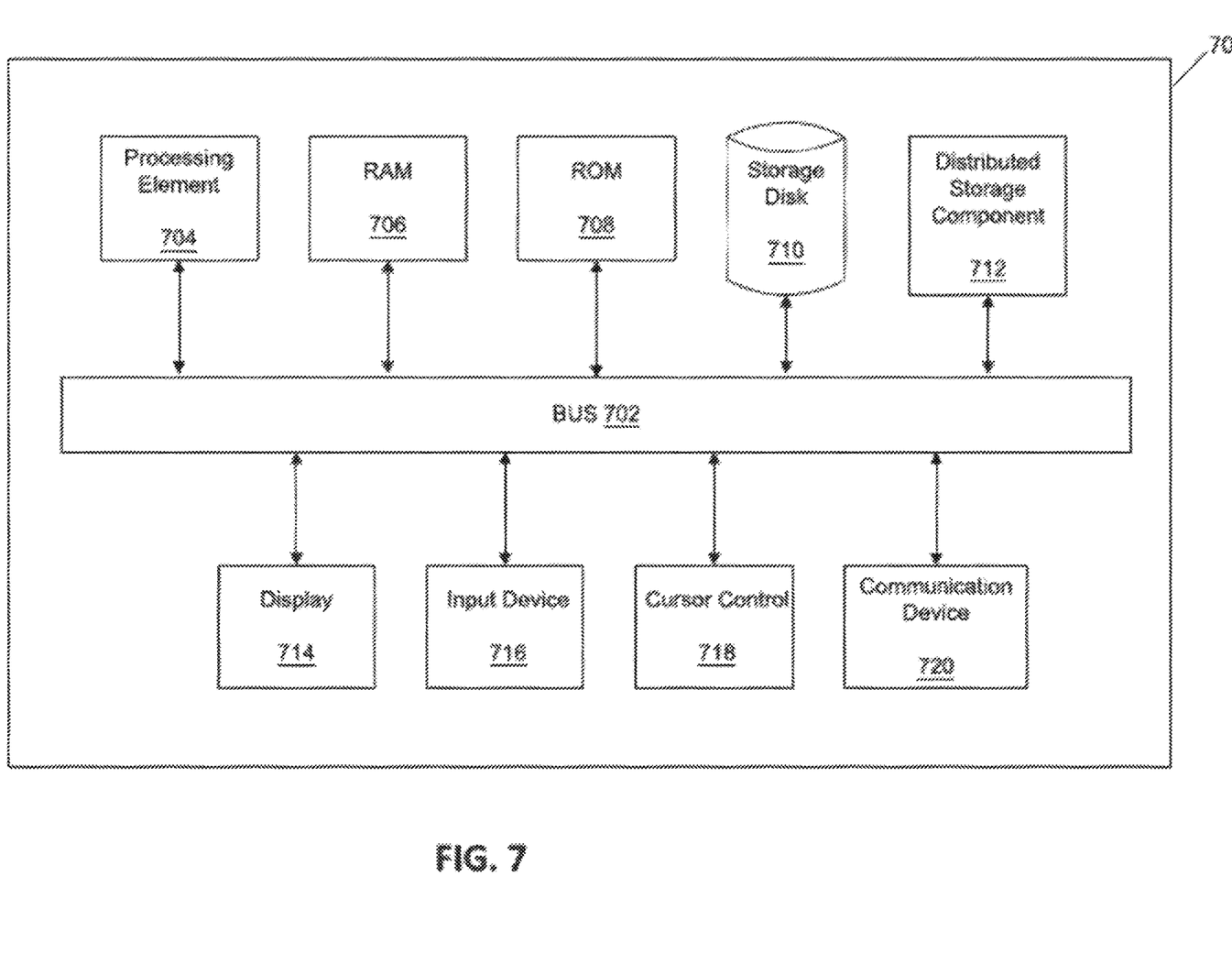
FIG. 7 depicts a block diagram of a computing device usable in conjunction with various examples of the disclosure.

FIG. 7 depicts a block diagram of a computing device, according to various aspects. In the illustrated example, the computing device 700 may include a bus 702 or other communication mechanism of similar function for communicating information, and at least one processing element 704 (collectively referred to as processing element 704) coupled with bus 702 for processing information. As will be appreciated by those skilled in the art, the processing element 704 may include a plurality of processing elements or cores, which may be packaged as a single processor or in a distributed arrangement. Furthermore, a plurality of virtual processing elements 704 may be included in the computing device 700 to provide the control or management operations for the system 100 or the method 600 discussed above.

The computing device 700 may also include one or more volatile memory(ies) 706, which can for example include random access memory(ies) (RAM) or other dynamic memory component(s), coupled to one or more busses 702 for use by the at least one processing element 704. Computing device 700 may further include static, non-volatile memory(ies) 708, such as read only memory (ROM) or other static memory components, coupled to busses 702 for storing information and instructions for use by the at least one processing element 704. A storage component 710, such as a storage disk or storage memory, may be provided for storing information and instructions for use by the at least one processing element 704. As will be appreciated, the computing device 700 may include a distributed storage component 712, such as a networked disk or other storage resource available to the computing device 700.

The computing device 700 may be coupled to one or more displays 714 for displaying information to a user. Optional user input device(s) 716, such as a keyboard and/or touchscreen, may be coupled to Bus 702 for communicating information and command selections to the at least one processing element 704. An optional cursor control or graphical input device 718, such as a mouse, a trackball or cursor direction keys for communicating graphical user interface information and command selections to the at least one processing element. The computing device 700 may further include an input/output (I/O) component, such as a serial connection, digital connection, network connection, or other input/output component for allowing intercommunication with other computing components and the various components of the system 100 or the method 600 illustrated above.

In various embodiments, computing device 700 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the system 100 or the method 600 illustrated above may be supported by operation of the distributed computing systems.

The computing device 700 may be operative to control operation of the components of the system 100 or the method 600 illustrated above through a communication device such as, e.g., communication device 720, and to handle data provided from the data sources as discussed above with respect to the system 100 or the method 600. In some examples, analysis results are provided by the computing device 700 in response to the at least one processing element 704 executing instructions contained in memory 706 or 708 and performing operations on the received data items. Execution of instructions contained in memory 706 and/or 708 by the at least one processing element 704 can render the system 100 or the method 600 operative to perform methods described herein.

The term "computer-readable medium" as used herein refers to any media that participates in providing instructions to the processing element 704 for execution. Such a medium may take many forms, including but not limited to, non-volatile media, volatile media, and transmission media. Non-volatile media includes, for example, optical or magnetic disks, such as disk storage 710. Volatile media includes dynamic memory, such as memory 706. Transmission media includes coaxial cables, copper wire, and fiber optics, including the wires that include bus 702.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 704 for execution. For example, the instructions may initially be carried on the magnetic disk of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which the processing element 704 retrieves and executes the instructions. The instructions received by memory 706 and/or memory 708 may optionally be stored on storage device 710 either before or after execution by the processing element 704.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method for writable document forgery detection, the method comprising:
    receiving a writable document, the writable document comprising a plurality of fields configured to receive a handwritten segment;
    extracting a first handwritten segment from at least one field, the first handwritten segment comprising a plurality of first pixels;
    extracting a second handwritten segment from another field of the plurality of fields of the writable document, the second handwritten segment comprising a plurality of second pixels;
    assigning to each first pixel and to each second pixel a likelihood of belonging to a handwritten segment, the likelihood of belonging to the handwritten segment comprising a fractional value;
    comparing the first handwritten segment to the second handwritten segment based on the assigned likelihood of each first pixel and each second pixel; and
    assessing a likelihood of the first handwritten segment and the second handwritten segment being from a same writer based on the comparison; wherein:
        the first handwritten segment comprises a first one of a payor signature in a payor signature field, a payee name in a payee name field, a spelled amount in a first amount field, an amount written as a number in a second amount field, and a date written in a date field; and
        the second handwritten segment comprises a second one of the payor signature in the payor signature field, the payee name in the payee name field, the spelled amount in the first amount field, the amount written as a number in the second amount field, and the date written in the date field, the second one being different from the first one.

2. The method of claim 1, wherein at least one of the plurality of first pixels and of the plurality of second pixels comprises a data structure, the data structure comprising a plurality of dimensions.

3. The method of claim 1, further comprising determining whether the first handwritten segment and the second handwritten segment are from a same writer based on the assessed likelihood.

4. The method of claim 1, wherein the second handwritten segment is one of:
    another field of the writable document; and
    another document.

5. The method of claim 1, wherein assigning to each first pixel and to each second pixel the likelihood of belonging to a handwritten segment comprises:
    inputting an image of the first handwritten segment and an image of the second handwritten segment into a first trainable model; and
    outputting the likelihood of belonging to a handwritten segment for each first pixel and for each second pixel from the first trainable model.

6. The method of claim 5, wherein the first trainable model comprises a first neural network.

7. The method of claim 5, wherein comparing the first handwritten segment to the second handwritten segment comprises:
    inputting the likelihood of belonging to a handwritten segment of the first pixels and the likelihood of belonging to a handwritten segment of the second pixels into a second trainable model; and
    outputting a similarity factor between the first pixels and the second pixels from the second trainable model.

8. The method of claim 7, wherein the second trainable model comprises a second neural network.

9. The method of claim 7, further comprising:
    establishing a similarity threshold; and
    determining that the first handwritten segment and the second handwritten segment are from the same writer when the similarity factor is equal to or greater than the similarity threshold.

10. The method of claim 7, wherein the plurality of fields comprise at least one handwritten field on a check.

11. The method of claim 1, wherein:
    extracting the first handwritten segment comprises extracting a plurality of first segments;
    extracting the second handwritten segment comprises extracting a plurality of second segments;
    comparing the first handwritten segment to the second handwritten segment comprises comparing a combination of the extracted plurality of first segments to the extracted plurality of second segments; and
    assessing the likelihood comprises:
        assessing a plurality of likelihoods for a combination of first segments and second segments being from a same writer; and
        combining the assessed plurality of likelihoods into an overall likelihood.

12. The method of claim 1, wherein a degree of shading of one or more of the first pixels and of one or more of the second pixels is correlated to the likelihood of the first pixels or the second pixels of belonging to a handwritten segment, the degree of shading comprising a grayscale between black and white.

13. A writable document forgery detection system comprising:
    a data receiver;
    an updatable data repository functionally coupled to the data receiver;
    a computing device operatively coupled to the data receiver and to the updatable data repository and comprising a memory;
    the memory storing instructions that, when executed by the processor, perform a set of operations comprising:

receiving, at the data receiver, a writable document comprising a plurality of fields, each field being configured to receive a handwritten segment;

extracting, via the computing device, a first handwritten segment from another field of the plurality of fields of the writable document, wherein the first handwritten segment comprises a plurality of first pixels;

extracting, via the computing device, a second handwritten segment, the second handwritten segment comprising a plurality of second pixels;

assigning, via the computing device, to each first pixel and to each second pixel a likelihood of belonging to a handwritten segment, the likelihood of belonging to the handwritten segment comprising a fractional value;

comparing, via the computing device, the first handwritten segment to the second handwritten segment based on the assigned likelihood of each first pixel and each second pixel; and assigning, via the computing device, a likelihood of the first handwritten segment and the second handwritten segment being from a same writer based on the comparison; wherein:

the first handwritten segment comprises a first one of a payor signature in a payor signature field, a payee name in a payee name field, a spelled amount in a first amount field, an amount written as a number in a second amount field, and a date written in a date field; and the second handwritten segment comprises a second one of the payor signature in the payor signature field, the payee name in the payee name field, the spelled amount in the first amount field, the amount written as a number in the second amount field, and the date written in the date field, the second one being different from the first one.

14. The system of claim 13, wherein at least one of the plurality of first pixels and of the plurality of second pixels comprises a data structure, the data structure comprising a plurality of dimensions.

15. The system of claim 13, wherein the instructions further comprise determining whether the first handwritten segment and the second handwritten segment are from a same writer based on the comparison.

16. The system of claim 13, wherein the second handwritten segment is one of:
another field of the writable document; and
another document.

17. The system of claim 13, wherein the set of instructions comprises assigning to each first pixel and to each second pixel the likelihood of belonging to a handwritten segment by:

inputting an image of the first handwritten segment and an image of the second handwritten segment into a first trainable model; and outputting the likelihood of belonging to a handwritten segment for each first pixel and for each second pixel from the first trainable model.

18. The system of claim 17, wherein the first trainable model comprises a first neural network.

19. The system of claim 17, wherein the set of instructions comprises comparing the first handwritten segment to the second handwritten segment by:

inputting the likelihoods of the first pixels and the likelihoods of the second pixels into a second trainable model; and outputting a similarity factor between the first pixels and the second pixels from the second trainable model.

20. The system of claim 19, wherein the second trainable model comprises a second neural network.

21. The system of claim 19, wherein the set of instructions further comprises:

establishing a similarity threshold; and determining that the first handwritten segment and the second handwritten segment are from the same writer when the similarity factor is equal to or greater than the similarity threshold.

22. The system of claim 17, wherein the plurality of fields comprise at least one handwritten field on a check.

23. The system of claim 13, wherein the instructions comprise:

extracting the first handwritten segment by extracting a plurality of first segments;

extracting the second handwritten segment by extracting a plurality of second segments;

comparing the first handwritten segment to the second handwritten segment by comparing a combination of the extracted plurality of first segments to the extracted plurality of second segments; and assessing the likelihood by:

assessing a plurality of likelihoods for a combination of first segments and second segments being from a same writer; and combining the assessed plurality of likelihoods into an overall likelihood.

24. The system of claim 13, wherein a degree of shading of one or more of the first pixels and of one or more of the second pixels is correlated to the likelihood of the first pixels or the second pixels of belonging to a handwritten segment, the degree of shading comprising a grayscale between black and white.

* * * * *

UNITED STATES PATENT AND TRADEMARK OFFICE
CERTIFICATE OF CORRECTION

| | | |
|---|---|---|
| PATENT NO. | : 12,327,431 B1 | Page 1 of 1 |
| APPLICATION NO. | : 18/416323 | |
| DATED | : June 10, 2025 | |
| INVENTOR(S) | : Filatov et al. | |

It is certified that error appears in the above-identified patent and that said Letters Patent is hereby corrected as shown below:

On the Title Page

Page 2, Column 1, Line 14, Item (56) "PCT/US2025/0117970" should read -- PCT/US2025/011790 --.

Signed and Sealed this
Twenty-ninth Day of July, 2025

Coke Morgan Stewart
*Acting Director of the United States Patent and Trademark Office*